United States Patent [19]

Masak et al.

[11] Patent Number: 4,755,983
[45] Date of Patent: Jul. 5, 1988

[54] DEDICATED MESSAGE MATCHED FILTER

[75] Inventors: Raymond J. Masak, East Northport; Frank M. Torre, Smithtown, both of N.Y.

[73] Assignee: Hazeltine Corporation, Greenlawn, N.Y.

[21] Appl. No.: 471,549

[22] Filed: Mar. 1, 1983

[51] Int. Cl.[4] ............................. H04J 1/12; H04J 9/42; H04B 15/00
[52] U.S. Cl. ............................................ 370/6; 370/19; 455/63; 455/303; 375/1; 375/96
[58] Field of Search ................ 370/6, 19; 455/63, 303; 375/1, 96

[56] References Cited

U.S. PATENT DOCUMENTS 4,164,628  8/1979  Ward et al. .......................... 370/19

Primary Examiner—Douglas W. Olms
Assistant Examiner—Frank M. Scutch, III
Attorney, Agent, or Firm—E. A. Onders

[57] ABSTRACT

In order to recover the original audio modulation samples when using a continuous code change, sampled data, spread spectrum waveform structure, a dedicated message matched filter is used to process data from multiple emitters within the same range interval. The dedicated message matched filter is matched to an incoming signal only at the precise time of the message epoch. The matched filter coding corresponding to the arrival time of message epochs as derived from synchronization acquisition circuitry is rapidly switched so that one dedicated message matched filter can be used to process data from multiple users simultaneously.

4 Claims, 2 Drawing Sheets

DEDICATED MESSAGE MATCHED FILTER

The government has rights in this invention pursuant to Contract No. F30602-76-C-0219 awarded by the U.S. Air Force.

BACKGROUND OF THE INVENTION

1. Field of the Invention

The invention generally relates to matched filters and, in particular, to dedicated message matched filters.

2. Description of the Prior Art

Audio or other information may be encoded on a spread spectrum waveform by periodically sampling and coding the information and modulating it on the waveform. In order to recover the original audio modulation samples, a matched filter for each code sequence is required that retains the code corresponding to a time interval equal to the transit time for an emitter at maximum range. The number of matched filters needed to process emitters anywhere within the total range interval is equal to the transit time at maximum range divided by the duration of one code subinterval. For example, a system with a maximum range of 200 miles and a code interval of 60 microseconds would require 20 matched filters if a conventional processor is employed. The purpose of this invention is to reduce the number of matched filters necessary to recover the original information.

SUMMARY OF THE INVENTION

It is an object of this invention to provide a dedicated message matched filter.

The invention is an apparatus for detecting audio information encoded in a spread spectrum waveform. The invention includes a dedicated message matched filter having a filter input for receiving the waveform, a control input for selecting the code to which the filter is matched and an output providing an uncoded signal corresponding to the waveform. First means determines the code of the spread spectrum waveform and is coupled to the control input. Second means decodes the matched signal and third means detects modulated information in the decoded, matched signal. The dedicated message matched filter includes a tapped delay line having an input for receiving the waveform and an output providing a delayed signal corresponding to the waveform. The filter also includes programmable tap weights having an input for receiving the delayed signal, a control input for receiving a code signal representative of the particular code of the waveform and an output providing the uncoded signal corresponding to the delayed signal, said tapped weights set in accordance with the code signal.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
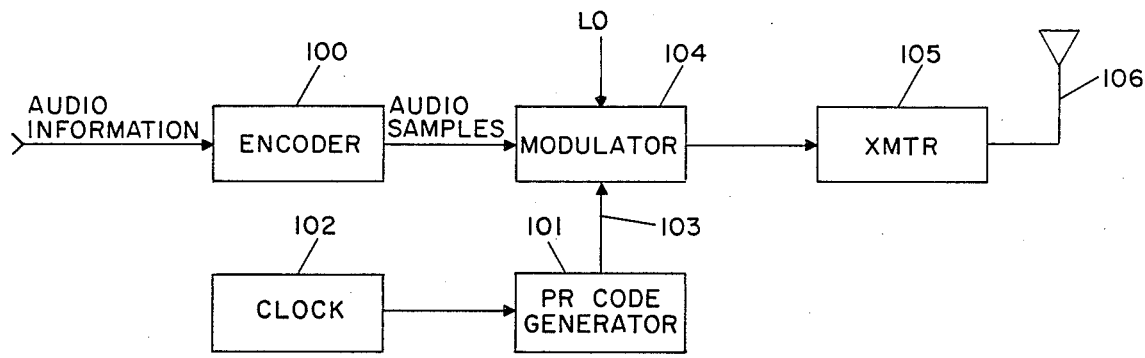
FIG. 1 is a block diagram of a transmitter for transmitting original audio modulation samples in a continuous code change, sampled data, spread spectrum waveform.

The invention relates to the recovery of original modulation samples when using a continuous code change, sampled data, spread spectrum waveform structure as described in co-pending patent application Ser. Nos. 407,981 and 407,982, both abandoned and incorporated herein by reference. Audio information which is to be transmitted is supplied to encoder 100 which provides audio samples representing the audio information. Pseudo-random code generator 101 referenced by clock 102 provides code information via line 103 to modulator 104 which modulates the code information and the audio samples on a signal provided by a local oscillator (LO). This modulated signal is provided to transmitter 105 for transmission by antenna 106.

Figure 2:
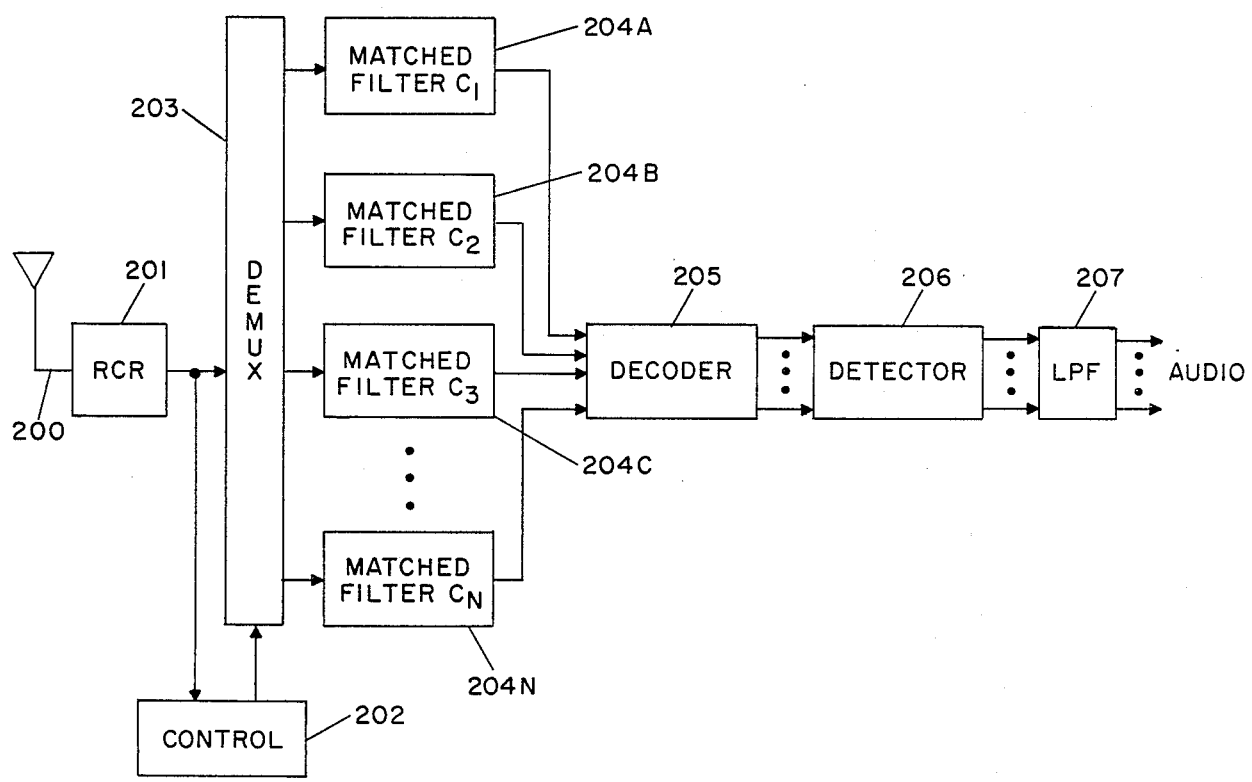
FIG. 2 is a block diagram of a receiver for recovering the original audio modulation samples including a matched filter for each code sequence.

In systems of this type, more than one transmitter as illustrated in FIG. 1 may be providing information to a receiver such as illustrated in FIG. 2. In order to recover the original audio information from each of the transmitters, a matched filter for each code sequence is required. The matched filter must retain the code corresponding to a time interval equal to the transit time for an emitter at maximum range. Incoming signals are received by antenna 200 and provided to receiver 201. The output of receiver 201 is provided to control 202 which detects the start of a code sequence and controls the demultiplexer 203 so that one and only one code sequence is provided to one and only one of matched filters 204a, 204b, . . . , 204n. The output from each matched filter 204 is provided to decoder 205 which decodes the information and provides it to detector 206 for detection and to low pass filter 207 for filtering.

Figure 3:
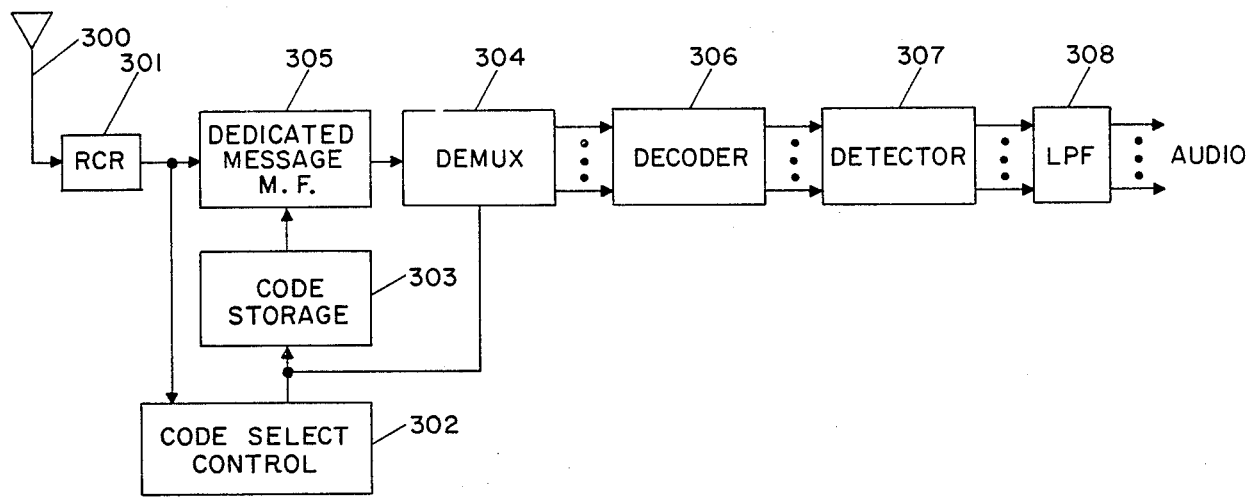
FIG. 3 is a block diagram of a receiver for recovering the original audio modulation samples including a dedicated message matched filter.

FIG. 3 illustrates a receiver employing a dedicated message matched filter according to the invention. The incoming signals received by antenna 300 and provided to receiver 301. The received signal is then provided to code select control 302 for detecting the code sequence of the incoming signal. Code select control provides a signal corresponding to the particular code at any instant to code storage 303 and demultiplexer 304. Code storage 303 provides a signal representing a code to dedicated message matched filter 305 which then provides the decoded information to demultiplexer 304 for decoding by decoder 306, detection by detector 307 and filtering by low pass filter 308. In this way, one filter can be used to process data from multiple emitters within the same range interval. The invention takes advantage of the fact that a matched filter need only be matched to an incoming signal at the precise time of message epoch. Therefore, by rapidly switching matched filter 305 through various codes corresponding to the arrival time of message epochs as derived from the synchronization acquisition circuitry of control 302, one matched filter can be used to process data from multiple users simultaneously.

Figure 4:
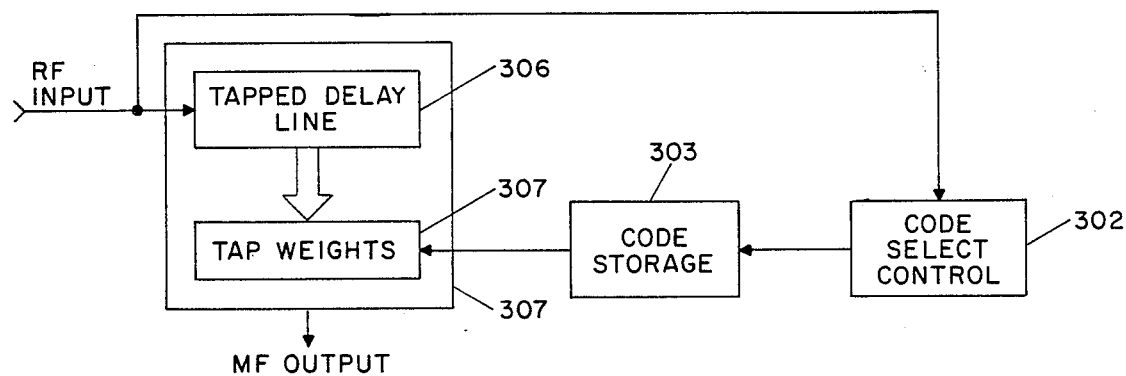
FIG. 4 is a block diagram of a dedicated message matched filter.

FIG. 4 illustrates one embodiment of a dedicated message matched filter 305 according to the invention including tap delay line 309 for receiving the input and tapped weights 310 which are programmed by code storage 303 controlled by code select control 302 to provide an uncoded output signal.

Figure 5:
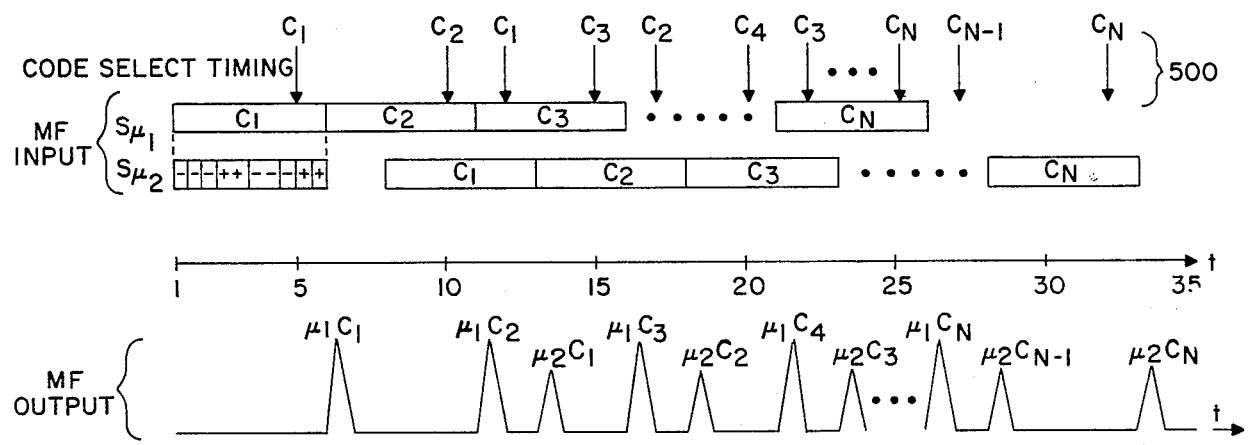
FIG. 5 is a real time signal format diagram illustrating the function of a dedicated message matched filter according to the invention.

The concept for processing two user signals simultaneously that are in different range intervals is illustrated in FIG. 5. The code required to process each user signal is different because of their range difference and different times of arrival. The code, as indicated in the timing diagram 500, is changed just prior to each epoch of each user. In the event that the epochs overlap in time and that two codes would be required simultaneously, the code change timing for one user can be slipped a few bits with a negligible loss in signal/noise ratio.

Rapid acquisition is achieved as follows. The matched filter is loaded (programmed) with the PN code corresponding to (the selected net) nominal zero range. The programmed code is compared to the received signal for a time interval corresponding to the maximum range period. Detections from each scan are correlated over several scans to detect and eliminate false alarms before the signal is presented to the operator. When the received code matches the programmed code the acquisition matched filter outputs a detection pulse indicating the time of arrival of the signal detection (corresponding to range).

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for detecting information encoded in a spread spectrum waveform comprising:
   (a) means having a waveform output for supplying the encoded, spread spectrum waveform;
   (b) first means having an input connected to the waveform output for determining the starting point of the particular code sequence of the spread spectrum waveform provided by the supplying means and having code output providing a signal corresponding to the determined code;
   (c) a matched filter having a filter input connected to the waveform output to which the waveform is applied, a control input responsive to the first means for determining the code to which the filter is matched, the control input being connected to the code output, and an output providing continuous wave signals corresponding to the waveform; and
   (d) second means for demultiplexing and detecting the information in the continuous wave signal.

2. The apparatus of claim 1 wherein said matched filter comprises a tapped delay line having an input for receiving the waveform connected to the waveform output and an output providing a delayed signal corresponding to the waveform; and
   programmable tap weights having inputs for receiving the delayed signal and connected to the delay line output, a control input connected to the control output for receiving the one particular code signal representative of the one particular code of the waveform and an output providing continuous wave signals corresponding to the delayed signal, said tap weights set in accordance with the code signal received by the control input from the code input.

3. The apparatus of claim 2 wherein said first means comprises code select control means for determining the start of each coded waveform message, said code select control means having an input corresponding to the first means input and having an output, and code storage means supplying the code of a particular message to the control input in response to the code select control means, said code storage means having an input connected to the code select control means output and having an output corresponding to the code output.

4. The apparatus of claim 3 wherein said demultiplexer has an input connected to the matched filter output, a plurality of outputs for supplying the continuous wave signals and a control input for controlling the switching of signals between the demultiplexer input and a selected demultiplexer output, said control input connected to the coded select control means output, said demultiplexer being responsive to the first means.

* * * * *